US012769351B2

(12) United States Patent
Spahmann et al.

(10) Patent No.: US 12,769,351 B2
(45) Date of Patent: Oct. 20, 2026

(54) DOOR ACTUATING DEVICE

(71) Applicant: AUDI AG, Ingolstadt (DE)

(72) Inventors: Andreas Spahmann, Neuenstadt (DE); Marcus Differenz, Backnang (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/290,673

(22) Filed: Aug. 5, 2025

(65) Prior Publication Data

US 2026/0044171 A1 Feb. 12, 2026

(30) Foreign Application Priority Data

Aug. 8, 2024 (DE) ......................... 102024122605.6

(51) Int. Cl.

| | |
|---|---|
| ***G05G 1/02*** | (2006.01) |
| ***B60J 5/04*** | (2006.01) |
| ***B60N 2/75*** | (2018.01) |
| ***B60R 13/02*** | (2006.01) |

(52) U.S. Cl.

CPC .............. *G05G 1/02* (2013.01); *B60J 5/0413* (2013.01); *B60N 2/78* (2018.02); *B60R 13/0243* (2013.01)

(58) Field of Classification Search

None

See application file for complete search history.

(56) References Cited

U.S. PATENT DOCUMENTS

| | | | | |
|---|---|---|---|---|
| 2022/0195759 | A1* | 6/2022 | Mensch | B60R 25/01 |
| 2024/0125161 | A1* | 4/2024 | Wölfle | E05F 15/611 |
| 2024/0352775 | A1* | 10/2024 | Scheiern | E05B 81/76 |

FOREIGN PATENT DOCUMENTS

| | | | |
|---|---|---|---|
| DE | 102006005753 | A1 | 8/2007 |
| DE | 102015013460 | A1 | 5/2016 |
| DE | 102016103926 | A1 | 9/2017 |
| DE | 102020122424 | A1 | 3/2021 |
| DE | 102020125358 | A1 | 3/2022 |
| DE | 112021001615 | T5 | 12/2022 |
| JP | 2017133210 | A | 8/2017 |

OTHER PUBLICATIONS

Office Action issued on Jul. 4, 2025, in corresponding German Application No. 102024122605.6, 6 pages German.

* cited by examiner

*Primary Examiner* — Thomas S Mccormack

(74) *Attorney, Agent, or Firm* — Maier & Maier, PLLC

(57) ABSTRACT

A door actuating device for controlling a door locking device, including an actuating surface for the user to apply an actuating force, a first switching device with a sensor device for detecting the actuating force and for transmitting an unlocking signal to the door lock device via an operating circuit when a predetermined first minimum force is detected, and a second switching device with a mechanical switch which can be closed when a predetermined second minimum force greater than the first minimum force is applied. When the switch is closed, an unlocking signal can be transmitted to the door lock device via an associated emergency circuit.

20 Claims, 2 Drawing Sheets

DOOR ACTUATING DEVICE

FIELD

The invention relates to a door actuating device.

BACKGROUND

Modern motor vehicles are increasingly equipped with electric door locking devices that comprise a power-driven actuator through which a locking element, that can be moved between a locking position and a release position, is operated. To control the door locking device, a door actuating device is provided which is provided in the interior of the vehicle in the door region, for example on an inside door panel, so that it is accessible to the person sitting next to the door. Such a door actuating device is designed, for example, as a button or similar and, when actuated to open the door, generates a corresponding switching signal via which the door unlocking device or its actuator integrated into an operating circuit is controlled and energized so that the unlocking takes place.

Such an electric door actuating device has, for example, a corresponding switching device comprising a sensor device via which an actuating force applied to an actuating surface of the door actuating device is detected. If a predetermined force level, i.e. a corresponding minimum force, is applied and determined, a corresponding signal is sent from the sensor device to a microcontroller, which then controls the door locking device or its actuator, so that the actuator is operated via the operating circuit and carries out the unlocking. The user is given a haptic feedback signal by means of an actuator assigned to the actuating surface, which indicates that the corresponding control signal has been generated and output. However, an additional safety function is also required which allows the door locking device to be operated even if this is not possible via the electrical door actuating device with its switching device and the associated sensor device, for example because the vehicle is partially or completely under water and, for example, the operating circuit is no longer available, but only an emergency circuit in which only a few selected operating components are integrated and which only provides a limited, reduced amount of current for a limited, short time. In such a case, it is conceivable to provide an additional, purely mechanical door opening device, for example a small emergency lever that is coupled to the door locking device via a Bowden cable, as has been customary up to now. However, since this mechanical door opening device is only intended for emergency purposes for redundancy reasons, this is an extremely complex design.

SUMMARY

The object of the invention is therefore to specify an improved door actuating device.

To achieve this object, according to the invention, a door actuating device for controlling a door locking device is provided, comprising an actuating surface for the user to apply an actuating force, a first switching device comprising a sensor device for detecting the actuating force and sending an unlocking signal to the door locking device via an operating circuit upon detection of a predetermined first minimum force, and a second switching device comprising a mechanical switching means which can be closed upon application of a predetermined second minimum force which is greater than the first minimum force, wherein upon closing of the switching means an unlocking signal can be sent to the door locking device via an associated emergency circuit.

The door actuating device according to the invention comprises, on the one hand, a first switching device which comprises a sensor device which is assigned to the actuating surface. This sensor device allows the detection of the actuation force with which the user presses a finger on the actuation surface. The sensor device is further configured to output an unlocking signal to the door locking device, for example via an integrated microcontroller, when it is detected that the user presses on the actuating surface with a predetermined first minimum force. As described, the actuating device is integrated into an operating circuit via which the sensor device is operated and in which the door locking device or its actuator is also integrated. If the unlocking signal is now given, the actuator is energized via the operating circuit and unlocks the door.

The safety function in the event of an emergency is provided in the door actuating device according to the invention via a second switching device. This second switching device comprises a mechanical switching means which can be closed upon application of a predetermined second minimum force to the actuating surface, which second minimum force is greater than the first minimum force. When the mechanical switching device is closed, a corresponding unlocking signal is sent via an emergency power circuit to the door unlocking device and its actuator, so that in emergency mode it is supplied and operated via the emergency power circuit and can carry out the unlocking. Since it is a mechanical switching means through which the emergency power circuit to the door locking device or its actuator in the operating field is closed, no power supply to the door actuating device is required to ensure this emergency function. The mechanical switching means actively closes the emergency power circuit or the corresponding connection to the door locking device and its actuator, enabling the power supply and control.

The door actuating device according to the invention thus has two separate switching devices connected quasi in parallel, namely the first electronic switching device comprising the sensor device, and the second mechanical switching device comprising the mechanical switching means. While the first switching device is integrated into the operating circuit and controls the operation of the door locking device or its actuator via the operating circuit, the second switching device is integrated into the emergency circuit and enables the control of the operation of the door locking device or its actuator via the emergency circuit. Both switching devices can be actuated via one and the same actuating element, namely the actuating surface. The different actuation is ultimately controlled solely by the actuation force applied. In normal operation, when the operating current is applied and the door locking device can be operated in normal operation, it is only necessary to lightly press the actuating surface with at least a first minimum force. The sensor device detects when this minimum force is reached and controls the microcontroller, which outputs the unlocking signal. However, if the operating current is not present in an emergency, but only the emergency power is available, the same actuating surface on the door actuating device can be actuated and pressed to control the door locking device, but with a significantly higher force. The actuating surface is assigned the second switching device or its mechanical switching means, which is actuated when the actuating surface is pressed with a second minimum force that is higher than the first minimum force. The mechanical switching device is then closed and the door locking device is operated via the emergency power circuit. The door actuating device according to the invention therefore allows electrically sensed actuation and control of the door locking device via the operating circuit during normal operation, while in emergency operation it allows mechanically sensed actuation and control of the door locking device via the emergency circuit.

An expedient further development of the invention provides that the contact surface is arranged on a support component movably mounted on a holding component, wherein the switching means can be actuated via a movement of the support component. The support component with the contact surface is fixed in a basic position on the holding component so that the contact surface can be easily pressed with the first minimum force without any movement of the support component relative to the holding component. In an emergency, however, if the contact surface is pressed with a significantly higher force and at least the second predetermined minimum force, the support component is moved from its basic position relative to the holding component, wherein the mechanical switching means is closed via this movement. There is therefore a mechanical movement of the support component to close the mechanical switching device.

The switching means itself is expediently arranged on the holding component and can be actuated via an actuating section provided on the support component. This actuating section can, for example, be a projecting arm or pin or similar, which in the basic position is spaced apart from the mechanical switching means, but runs against the switching means during the movement of the support component and closes it.

According to a further development of the invention, the support component itself is fixed in the basic position by means of holding means acting between the support component and the holding component, which holding means can be released when the second minimum force is reached. Thus, there is a releasable fixing of the support component to the holding component via the holding means, which are designed in such a way that they maintain the fixing when a small force is applied, but release the fixing when a higher force is applied, which corresponds at least to the second minimum force.

These holding means can be, for example, magnetic elements, i.e. corresponding magnetic elements, for example permanent magnets, are arranged on the support component and on the holding component, which interact magnetically in the basic position and fix the support component accordingly. However, if sufficient force is applied, this magnetic fixation can be overcome so that the support component is moved out of its basic position. The magnetic elements also allow the support component to be returned to its basic position if necessary.

Alternatively, the holding means can also be locking or clip elements. This means that the support component is locked or clipped to the holding component via corresponding locking or clip elements. This snap-in or clip connection is designed in such a way that it is sufficiently stable when a lower force is applied, but is opened when a correspondingly higher force is applied, i.e. at least the second minimum force. This opening can be reversible, i.e. the support component can be locked in the basic position again after a single actuation. It can be irreversible and result in the destruction of the locking or clip elements.

The first minimum force should be in the range of 1.5-4.0 N, in particular in the range between 2.0-3.0 N and preferably at approx. 2.5 N. The second minimum force should be in the range between 8.0-12.0 N, in particular between 9.0-11.0 N and preferably at approx. 10 N. It must be ensured that there is always a sufficiently large difference between the first and second minimum force so that the mechanical switching element is not accidentally activated by pressing only slightly harder.

The stroke of the switching means should be 0.1-1.0 mm, i.e. as small as possible. A stroke that is too large is not desirable, as it has to be operated in an emergency situation. This also means that the movement of the support component relative to the holding component, i.e. the stroke of the support component, is also correspondingly small, so that even a slight movement about the aforementioned approx. 0.1-1.0 mm is sufficient to close the mechanical switching device.

In addition to the door actuating device, the invention further relates to an interior trim component of a motor vehicle, comprising at least one door actuating device of the type described above. Usually, each door of the motor vehicle, possibly also a tailgate, is equipped with such a door actuating device or is assigned such a door actuating device, so that each opening through which a person inside the vehicle can leave the vehicle in an emergency can also be unlocked via such a secure door actuating device.

The interior trim component is preferably an interior door trim, in particular an armrest of such a door trim. This design ensures that the door actuating device is arranged in the immediate reach of the person sitting on a seat adjacent to the door.

Finally, the invention relates to a motor vehicle comprising at least one door interior trim component of the type described above.

BRIEF DESCRIPTION OF THE FIGURES

Further advantages and details of the present invention will be apparent from the exemplary embodiments described below and in reference to the drawings. In particular.

DETAILED DESCRIPTION

Figure 1:
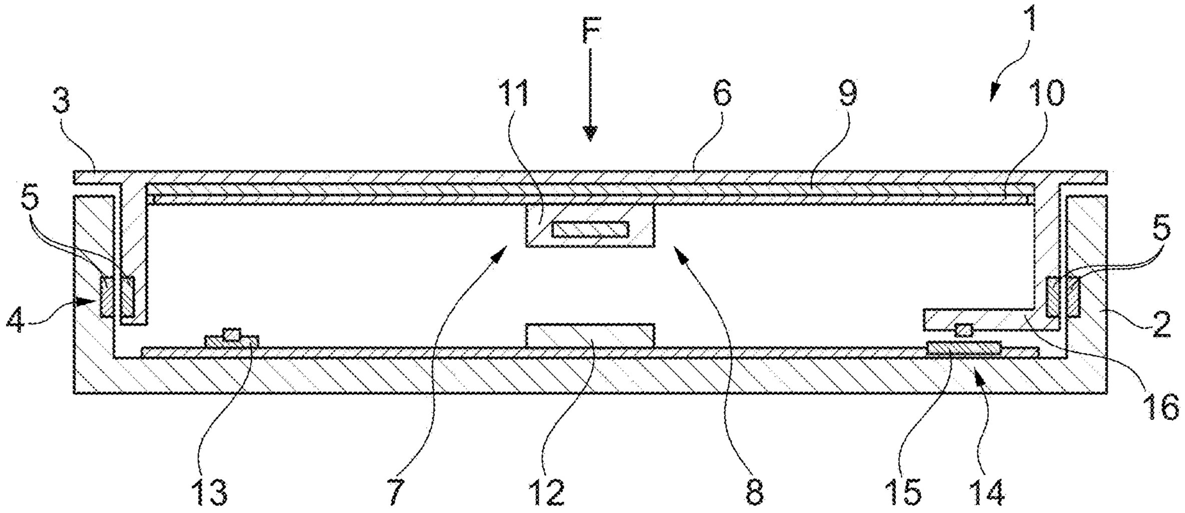
FIG. 1 shows a schematic diagram of a door actuating device according to the invention.

FIG. 1 shows a schematic diagram of a door actuating device 1 according to the invention, which is designed in the manner of a switch or button. The door actuating device comprises a holding component 2, which is, for example, pot-shaped and made of plastic. It further comprises a support component 3, which is also made of plastic and which engages in the holding component 2. The support component 3 is fixed in a basic position on the holding component 2 via holding means 4, in the example shown magnetic elements 5. However, these holding means 4 can be released so that the support component 3 can be pressed into the holding component 2. Instead of such magnetic elements 5, fixing in the basic position via locking or clip elements would also be conceivable.

The support component 3 has a contact surface 6 onto which the user can press with a finger and apply an actuating force F for actuation. In the interior, i.e. the cavity defined by the holding component 2 and the support component 3, a first switching device 7 comprising sensor device 8 is arranged. On the one hand, this comprises a sensor surface 9 arranged below the actuating surface 6, which serves as a force sensor and is designed, for example, as a strain gauge and via which an actuating force F applied to the actuating surface 6 is detected. A capacitive sensor element 10 is assigned to the sensor surface 9, but this is optional. This capacitive sensor element 10 can detect whether the actuating surface 6 is actually pressed with a finger and therefore an intentional actuation takes place, or whether it is only accidentally touched, for example, with a body part such as the elbow or the like. Furthermore, an actuator 11 is provided which, when a minimum force is detected via the sensor surface 9, which is for example approximately 2.5 N, sends a haptic signal to the structure above, which is detected via the finger, which is still lying on the contact surface 6, whereby the user receives feedback that his actuation or control request has been detected. The actuator can, for example, be a piezo element, so that active haptics are integrated. A lighting device 13, e.g. an LED, can also be provided to backlight the actuating surface.

Furthermore, sensor device 8 comprises a microcontroller 12, via which a control signal can be output, which is sent as an unlocking signal to a door locking device, comprising an electrical actuator which is integrated in an operating circuit and which is then energized via this and releases a locking element of the door locking device so that the door can be opened. The sensor device 8 is therefore part of the first switching device 7, via which an electrical control signal, i.e. the unlocking signal, is given to energize the actuator of the door locking device. This represents the normal operation to unlock the door. If a person in the vehicle wants to open the door, they simply press lightly with their finger on the touch surface 6. The sensor surface 9 determines the strength of the force. If this reaches a relatively low first minimum force of, for example, 2.5 N, a corresponding detection signal is output to the microcontroller 12, which then sends the unlocking signal to the door locking device or its actuator, so that it is actuated via the operating circuit. At the same time, a haptic feedback signal is sent to the user via actuator 8.

However, the door actuating device 1 according to the invention is also equipped with an emergency function. For this purpose, a second switching device 14 is provided, comprising a mechanical switching means 15 which can be actuated in an emergency and via which an emergency power circuit is closed, in which the door locking device or its actuator is integrated, so that in an emergency, when only emergency power is available, the latter can be briefly controlled and operated via the emergency power circuit. This emergency function is provided when normal operation is not possible, i.e. the operating circuit is not active or the operating current is not available.

The mechanical switching means 15 is actuated via the support component 3, which for this purpose has an actuating section 16 arranged adjacent to the switching means 15, for example a simple switch. As described, the support component 3 is fixed by the holding means 4, but these holding means 4 can be released when a sufficiently high force is applied to the actuating surface 6. If the user presses the actuating surface 6 with sufficient force in an emergency situation, for example with a second minimum force of approximately 10 N, the support component 3 is moved from a basic position and pressed minimally into the holding component 2. With this small movement, which is for example in the range of 0.1-1 mm, the actuating section 16 runs against the mechanical switching means 15 and closes it. This sometimes very brief closing of the switching means 15 generates a short switching front or emergency current edge, which is sufficient for the actuator of the door locking device to be energized and to unlock the door. It is therefore possible to safely open the assigned door from the interior via the door actuating device 1 even in an emergency, when only an emergency power supply is possible, usually with an emergency current <0.02 A, but no operating power supply, usually with an operating current >0.02 A.

Figure 2:
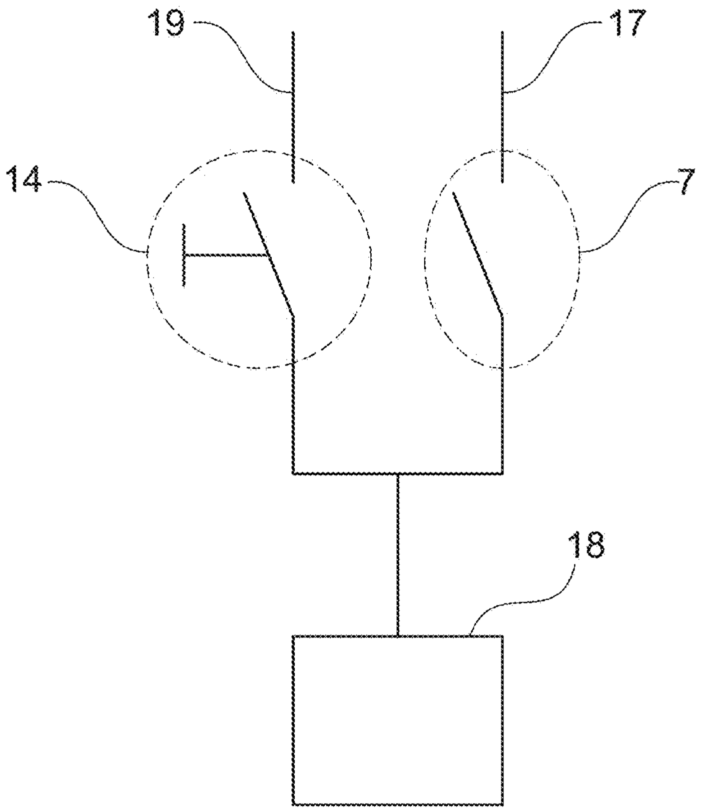
FIG. 2 shows a schematic diagram of the circuit structure.

FIG. 2 shows a schematic diagram of the basic circuit structure. Shown is the first switching device 7, via which an operating current can be switched to the door locking device 18 via an operating circuit 17, or its actuator can be controlled. Also shown is the second switching device 14, i.e. the emergency switching device, via which an emergency current can be switched to the door locking device 18 or the actuator via an emergency circuit 19 in an emergency.

Figure 3:
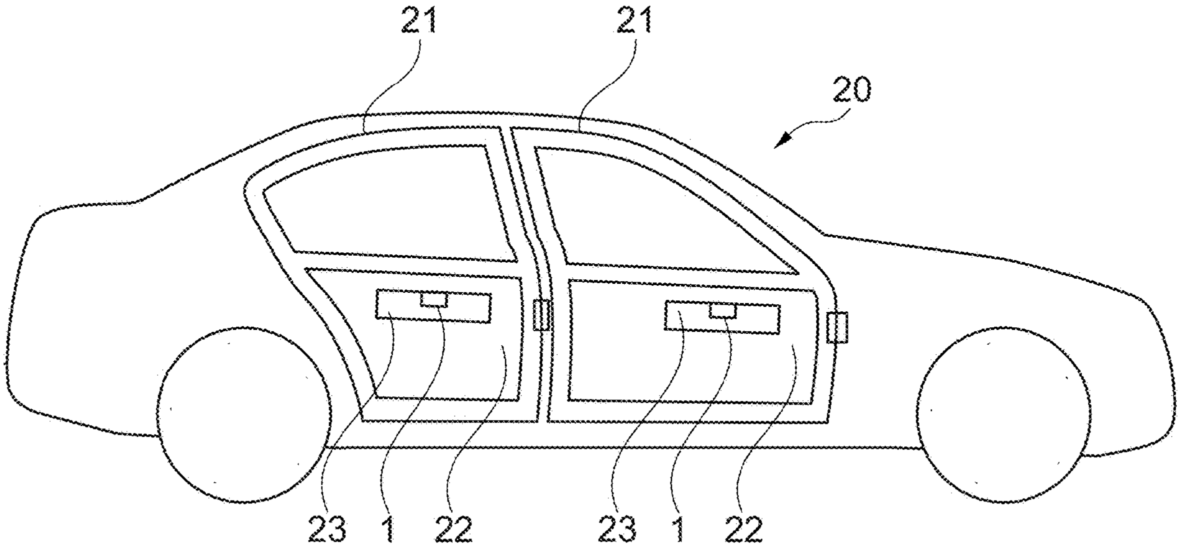
FIG. 3 shows a schematic diagram of a motor vehicle according to the invention.

FIG. 3 finally shows a motor vehicle 20 according to the invention, with two doors 21, each having an interior trim component 22 with an armrest 23, wherein a door actuating device 1 according to the invention is integrated in each armrest 23 and is therefore located in the immediate gripping range of a person sitting adjacent to the door 21.

The invention claimed is:

1. A door actuating device for controlling a door locking device, comprising: an actuating surface for the user to apply an actuating force, a first switching device comprising a sensor device for detecting the actuating force and for transmitting an unlocking signal to the door locking device via an operating circuit when a predetermined first minimum force is detected, and a second switching device comprising a mechanical switching means which can be closed when a predetermined second minimum force greater than the first minimum force is applied, wherein, when the switching means is closed, an unlocking signal can be transmitted to the door lock device via an associated emergency circuit.

2. The door actuating device according to claim 1, wherein the contact surface is arranged on a support component which is movably mounted on a holding component, wherein the switching means can be actuated via a movement of the support component.

3. The door actuating device according to claim 2, wherein the switching means is arranged on the holding component and can be actuated via an actuating section provided on the support component.

4. The door actuating device according to claim 2, wherein the support component is fixed in a basic position by means of holding means acting between the support component and the holding component, which holding means can be released when the second minimum force is reached.

5. The door actuating device according to claim 4, wherein the holding means are magnetic elements, or in that the holding elements are locking or clip elements.

6. The door actuating device according to claim 1, wherein the first minimum force is 1.5-4.0 N and the second minimum force is 8.0-12.0 N.

7. The door actuating device according to claim 1, wherein the switching means has a stroke of 0.1-1.0 mm.

8. An interior trim component of a motor vehicle, comprising at least one door actuating device according to claim 1.

9. The interior trim component according to claim 8, characterized in that, it is an inner door panel, in particular an armrest of such an inner door panel.

10. A motor vehicle comprising at least one interior trim component according to claim 8.

11. The door actuating device according to claim 3, wherein the support component is fixed in a basic position by means of holding means acting between the support component and the holding component, which holding means can be released when the second minimum force is reached.

12. The door actuating device according to claim 2, wherein the first minimum force is 1.5-4.0 N and the second minimum force is 8.0-12.0 N.

13. The door actuating device according to claim 3, wherein the first minimum force is 1.5-4.0 N and the second minimum force is 8.0-12.0 N.

14. The door actuating device according to claim 4, wherein the first minimum force is 1.5-4.0 N and the second minimum force is 8.0-12.0 N.

15. The door actuating device according to claim 5, wherein the first minimum force is 1.5-4.0 N and the second minimum force is 8.0-12.0 N.

16. The door actuating device according to claim 2, wherein the switching means has a stroke of 0.1-1.0 mm.

17. The door actuating device according to claim 3, wherein the switching means has a stroke of 0.1-1.0 mm.

18. The door actuating device according to claim 4, wherein the switching means has a stroke of 0.1-1.0 mm.

19. The door actuating device according to claim 5, wherein the switching means has a stroke of 0.1-1.0 mm.

20. The door actuating device according to claim 6, wherein the switching means has a stroke of 0.1-1.0 mm.

* * * * *